E. S. LONG.
METHOD FOR RETREADING SOLID RUBBER TIRES.
APPLICATION FILED MAR. 31, 1919.

1,330,128.

Patented Feb. 10, 1920.
4 SHEETS—SHEET 1.

Inventor:
Emmet S. Long
by Hazard & Miller
Att'ys.

E. S. LONG.
METHOD FOR RETREADING SOLID RUBBER TIRES.
APPLICATION FILED MAR. 31, 1919.
1,330,128.
Patented Feb. 10, 1920
4 SHEETS—SHEET 2.
Fig. 3.
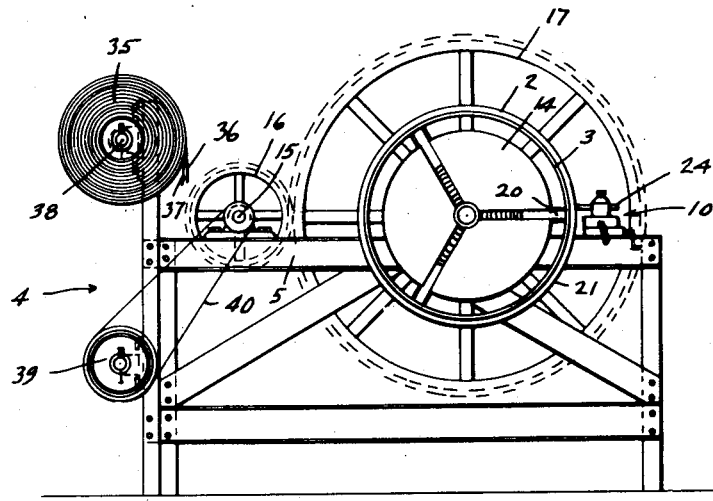
Fig. 4.
Fig. 5.
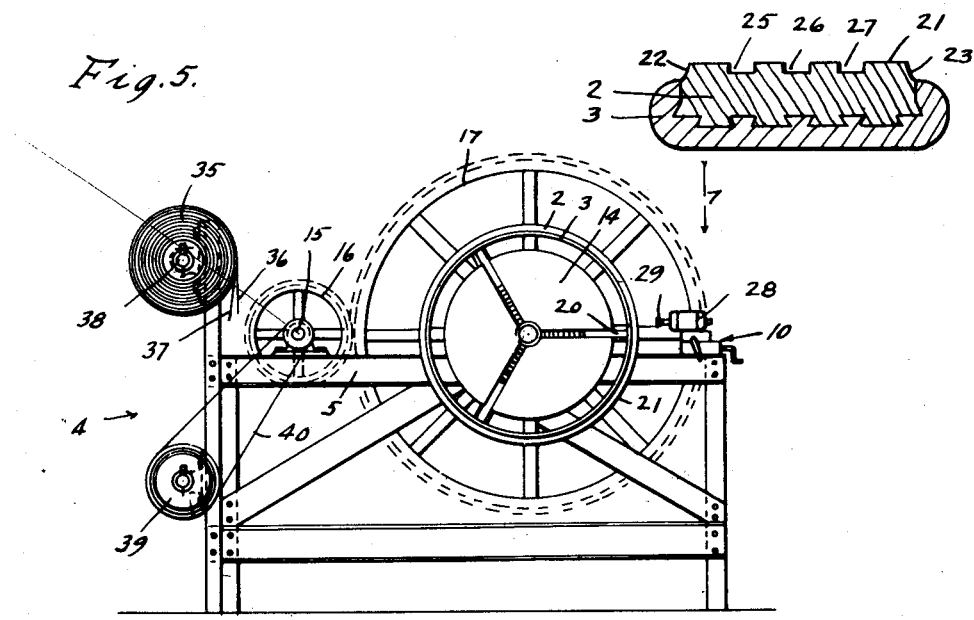
Fig. 6.
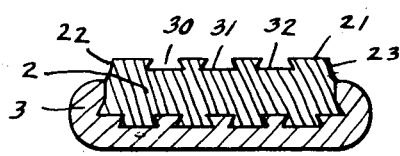
Inventor:
Emmet S. Long,
by Hazard & Miller
Attys.

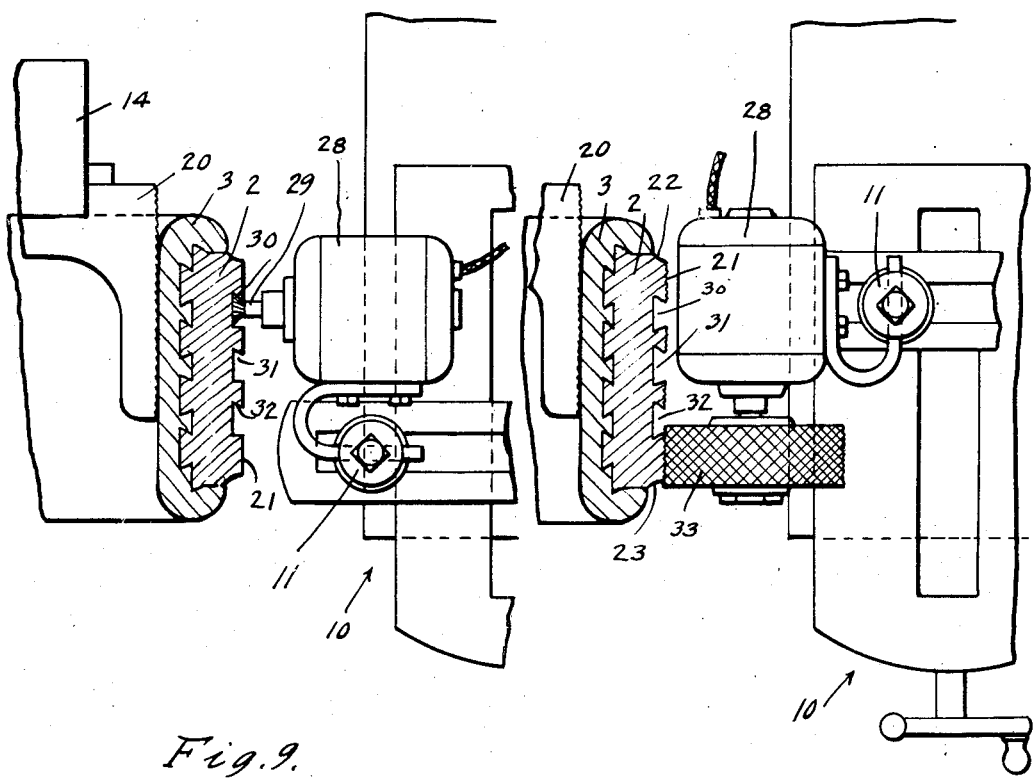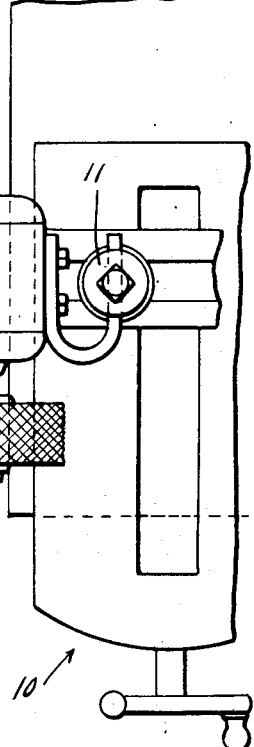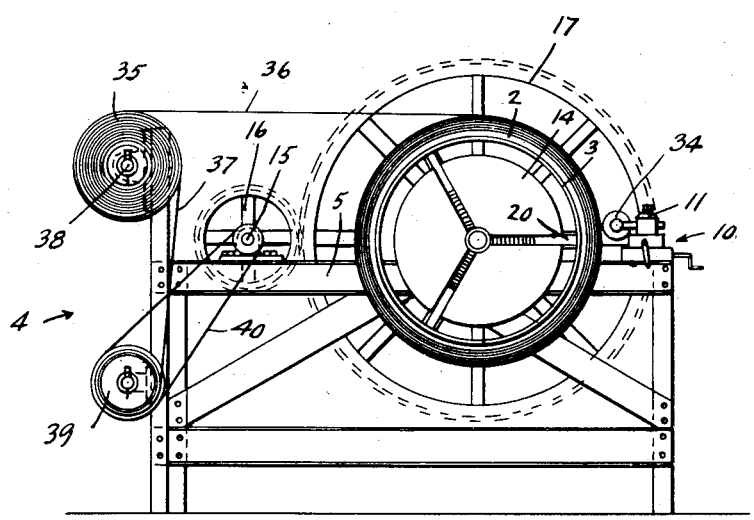

E. S. LONG.
METHOD FOR RETREADING SOLID RUBBER TIRES.
APPLICATION FILED MAR. 31, 1919.
1,330,128.
Patented Feb. 10, 1920.
4 SHEETS—SHEET 4.
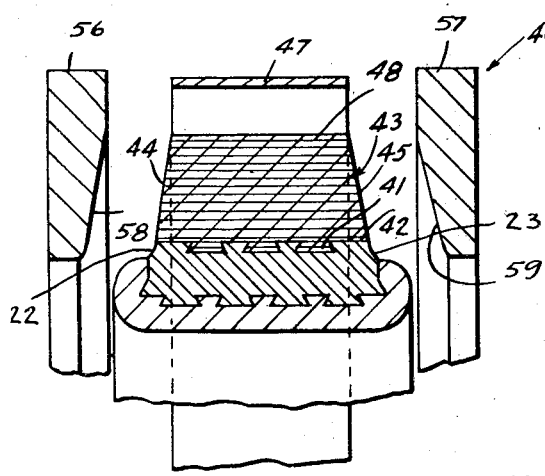
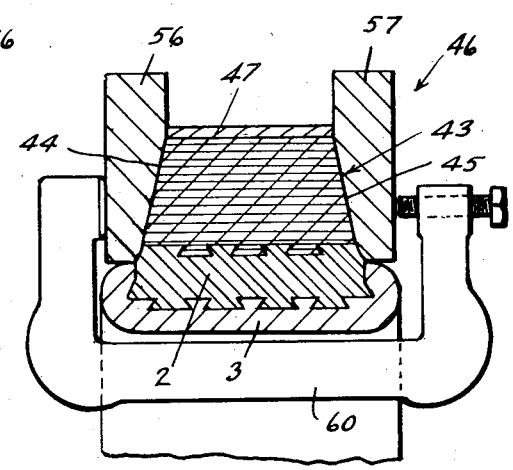
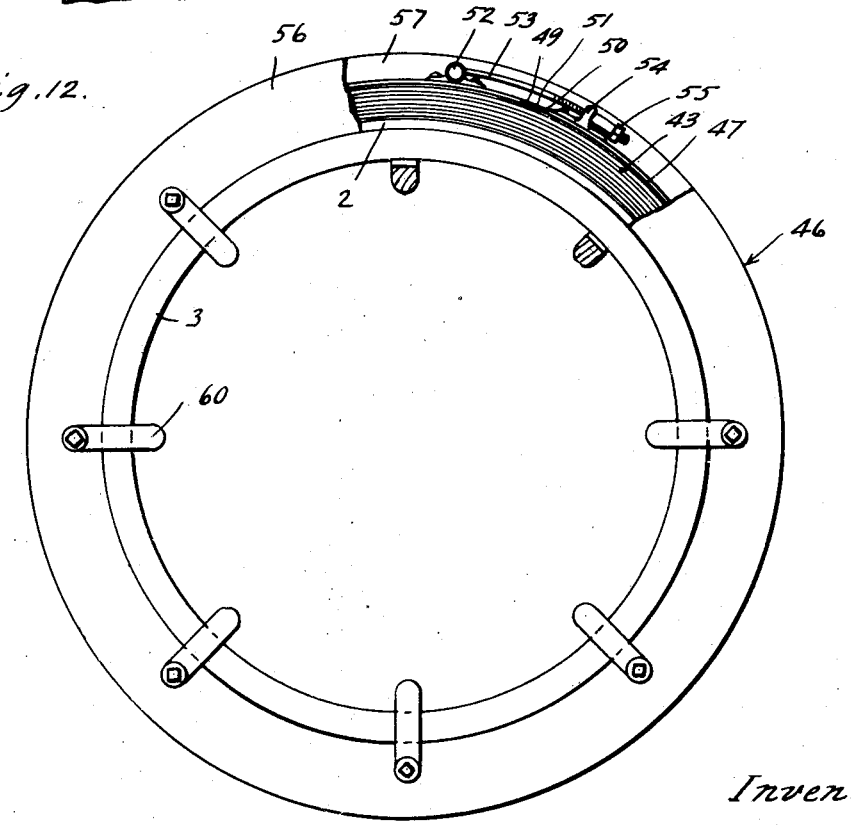
Inventor:
Emmet S. Long,
by Hazard & Miller
Attys.

UNITED STATES PATENT OFFICE.

EMMET S. LONG, OF LOS ANGELES, CALIFORNIA.

METHOD FOR RETREADING SOLID RUBBER TIRES.

1,330,128. Specification of Letters Patent. Patented Feb. 10, 1920.

Application filed March 31, 1919. Serial No. 286,536.

*To all whom it may concern:*

Be it known that I, EMMET S. LONG, a citizen of the United States, residing at Los Angeles, in the county of Los Angeles and State of California, have invented new and useful Improvements in Methods for Retreading Solid Rubber Tires, of which the following is a specification.

My object is to make a method for retreading solid rubber tires, and my invention consists of the novel features herein shown, described and claimed.

Specifically the object of my method is to take a worn solid rubber tire together with the rim upon which the tire was made and upon which the worn tire is mounted place the rim and worn tire upon a lathe construction, turn the worn face down to a smooth face, make grooves in the smooth face, machining the grooves to make dovetail grooves, machining the periphery to make a rough bonding surface, applying rubber cement, dry the cement, applying gum rubber in the dovetail grooves and then across the periphery to the cemented roughened surface, roll the gum rubber hard, and build up the tread to the desired extent, trim the new rubber to the desired shape, place the rim carrying the old rubber and the new rubber in a mold and vulcanize.

Fig. 3 is a side elevation of the lathe construction as seen looking in the direction indicated by the arrow 3 in Fig. 1 and showing the operation of cutting straight faced grooves in the straight faced periphery of the old tire.

Fig. 4 is a cross section of the old tire and rim as it comes from the operation shown in Fig. 3.

Fig. 5 is a view analogous to Fig. 3 and showing the operation of machining the straight faced grooves shown in Fig. 4 to produce the dovetail grooves shown in Fig. 6.

Fig. 6 is a view analogous to Fig. 4 and showing the dovetail grooves.

Fig. 7 is an enlarged fragmentary sectional detail illustrating the operation of machining the straight faced grooves to produce the dovetail grooves, the view being taken looking in the direction indicated by the arrow 7 in Fig. 5.

Fig. 8 is a view analogous to Fig. 7 and showing the operation of roughening the straight peripheral face of the old tire after it has been machined and grooved.

Fig. 9 is a view analogous to Figs. 3 and 5 and showing the operation of applying the gum rubber to fill the dovetail grooves and to build up the new tread and the operation of rolling the gum rubber and pressing it hard into place.

Fig. 10 is a cross section showing the built up new tread and the parts of the mold ready to be applied for vulcanizing.

Fig. 11 is a cross section showing the parts of the mold applied to the new tread ready for vulcanizing.

Fig. 12 is a plan of the complete mold with the rim and old rubber and new rubber in place ready to vulcanize, the new rubber parts being broken away and shown in section.

In the use of solid rubber tires, as on trucks, the periphery or tread face 1 of the rubber may be half worn away, more or less, and the worn process produces a ragged uneven face. The original rubber tire 2 is formed and vulcanized upon a metal rim 3, and when the tire is too badly worn for further use it is necessary to either retread the tire or throw away the old tire and rim, and it is found that by retreading the old tire half, or more, of the rubber is saved and the old rim is saved.

Figure 1:
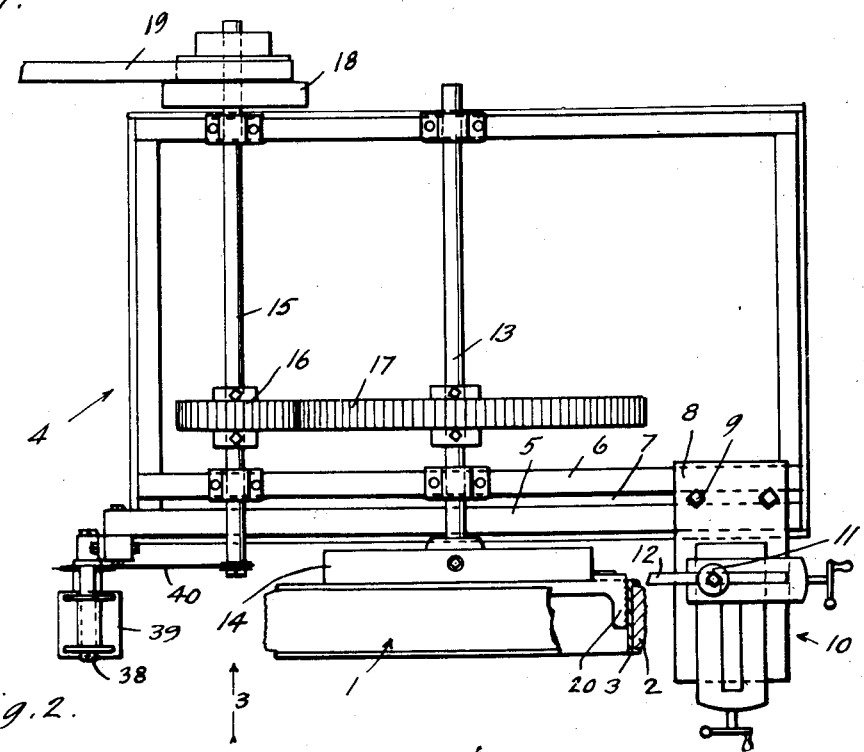
Figure 1 is a top plan view showing a worn, old tire mounted upon the lathe construction to be machined to remove the ragged material and produce a smooth face, parts being broken away and shown in section to show the tire and rim.
Figure 2:
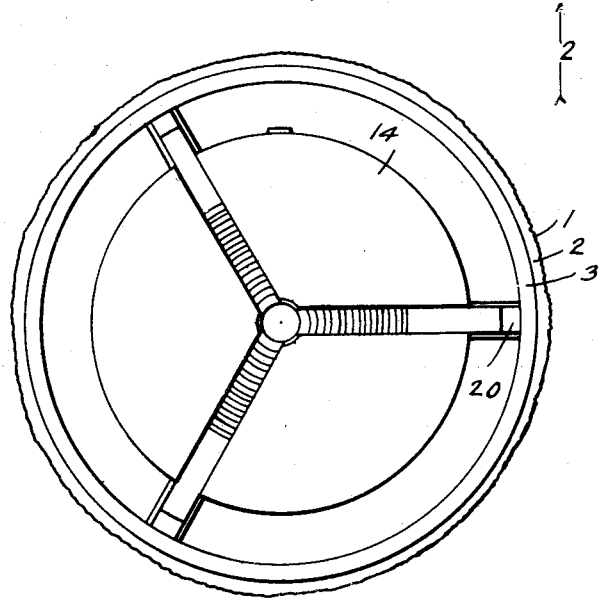
Fig. 2 is a side elevation of the old tire mounted on a chuck ready for machining, the view being taken looking in the direction indicated by the arrow 2 in Fig. 1.

In preparing to repair an old solid tire of this kind, I provide a lathe construction 4. The lathe construction comprises a frame which is rectangular in plan, as shown in Fig. 1, and suitably elevated, as shown in Fig. 3. The bed bars 5 and 6 are mounted parallel and horizontal at the upper front side of the frame to form a slot 7, the carriage plate 8 fits upon the bed bars 5 and 6, and bolts 9 are inserted upwardly through the slot 7, and through the plate 8, so that the plate 8 may be moved longitudinally of the bars 5 and 6 to any desired position and clamped by tightening the bolts 9. The compound tool post support 10 is mounted upon the plate 8, the tool post 11 is mounted in the support 10 and the lathe tool 12 is mounted in the tool post 11. The chuck shaft or spindle 13 is mounted transversely of the frame, and the standard universal chuck 14 is mounted upon the forward end of the shaft 13, the countershaft 15 is mounted parallel with the shaft 13, and the pinion 16 fixed upon the countershaft 15 meshes with the large gear 17 fixed upon the shaft 13. The countershaft 15 carries step driving pulleys 18 to be operated by a belt 19. The old tire rim 3 is placed upon the jaws 20 of the chuck 14 and the chuck operated to expand the jaws to grip and center the tire rim.

Then the machining operation proceeds to trim the ragged, worn, peripheral face 1 of the old tire to produce a smooth, continuous, straight, peripheral face 21, and to trim the ragged, worn, side faces to produce the smooth new side faces 22 and 23.

Then the facing tool 12 is removed from the tool post and a grooving tool 24 substituted.

Then the machining operation proceeds to cut the straight side grooves 25, 26 and 27, shown in Fig. 4, from the periphery 21.

Then the tool 24 is removed from the tool post and the motor 28 substituted. The motor 28 carries an end and side miller 29, and the tool post support is manipulated to mill first one side and then the other of the grooves 25, 26 and 27 to produce the dovetail grooves 30, 31 and 32, shown in Figs. 6 and 7.

Then the tool 29 is removed from the motor 28 and the circular rasp 33 is substituted and the operation continues to file and roughen the peripheral face 21 to prepare it for bonding with the cement and gum rubber, this operation being shown in Fig. 8.

After the old tire comes from the operation shown in Fig. 8, that is with the dovetail grooves 30, 31 and 32 made, the sides 22 and 23 finished, and the periphery 21 roughened. A quantity of liquid rubber cement is applied to the faces 21, 22 and 23 and to the faces of the grooves 30, 31 and 32 and allowed to dry for a considerable time. The drying operation may be assisted by artificial heat to any desired extent.

Then the old tire is again mounted upon the lathe construction. The motor 28 carrying the rasp 33 is removed from the tool post and a rolling tool 34 is substituted. The spool 35 of gum rubber 36 and separating material 37 is mounted upon an arbor 38, the arbor 38 is mounted upon the frame 4 in line with the old rubber tire 2 when the rim 3 is upon the chuck. A rewinding drum 39 is mounted below the arbor 38 and connected by a belt 40 to the countershaft 15.

The gum rubber 36 may be first cut into strips 41 and the strips 41 rolled into the dovetail grooves 30, 31 and 32.

Then a strip 42 is applied to the roughened cemented face 21 to cover the face and to cover the strips 41 and to make a good bond.

Then as the operation goes on, the roller 34 presses hard against the gum rubber 36, the shaft 13 rotates to rotate the tire, the gum rubber unwinds from the spool 35 and the separating material 37 is rewound upon the drum 39. The principal object of the drum 39 is to pull the strip 37 from the sticky face of the gum rubber 36.

After a sufficient amount of the gum rubber has been applied to build up the new tread 43 to the desired height the connection with the spool 35 may be cut and the rolling operation continued as desired.

Then the roller 34 is removed from the tool post 11 and a side cutting tool applied to the tool post to trim the sides 44 and 45 of the new rubber to match the sides 22 and 23 of the old rubber and the retread tire is ready for the vulcanizing mold 46.

The details of the vulcanizing mold 46 are as follows:

A band 47 of heavy strap iron is made to fit the width of the peripheral face 48 of the new tread and long enough to extend around the peripheral face. The meeting ends of the band 47 are reduced in thickness to make half laps 49 and 50, and a half lap section 51 is inserted under the half laps 49 and 50 so as to break the joint between the ends of the band 47. A bearing 52 is secured to the band 47 near one end, a tension screw 53 is secured to the bearing 52 and extends through a bracket 54 secured the other end of the band 47, and a nut 55 is placed upon the tension screw behind the bracket 54 so that by tightening the nut 55 the band 47 is drawn tightly upon the periphery of the new tread 43.

The side plates 56 and 57 are annular flat rings having beveled inner faces 58 and 59 fitting against the faces 22 and 23 and the faces 44 and 45, and against the edges of the band 47. The side plates are placed in position and the C-clamps 60 are inserted preferably from the inside of the rim 3 and tightened to tighten the plates 56 and 57 against the rubber and against the band 47.

Any desired number of C-clamps may be used, and when the C-clamps have been applied the mold containing the tire may be rolled like a wheel; this facilitates the handling of the mold which is of considerable weight, and the mold is then placed in a steam kettle for vulcanizing. After the vulcanizing operation the C-clamps and other parts of the mold are removed and the tire is retreaded and ready for use.

Thus I have produced a method for retreading old solid rubber tires which is simple to operate and which will produce rebuilt tires at a great saving in cost, and which will be practically as good as new tires.

Various changes may be made without departing from the spirit of my invention as claimed.

I claim:

1. The method for retreading solid rubber tires which consists of rotating the worn tire, turning the worn face down to a smooth face, making straight faced grooves in the smooth face, milling the straight faced grooves to make dovetail grooves, filing the periphery of the smooth surface to roughen the face and produce a bonding surface applying rubber cement to the roughened bonding surface and to the faces of the dovetail grooves, drying the cement, applying gum rubber in the dovetail grooves to fill the grooves and then across the periphery to the cemented roughened surface, rolling the gum rubber and building up the tread to the desired height, trimming the new rubber to the desired shape and placing the rim carrying the old rubber and the new rubber in a mold and vulcanizing.

2. The step in a method for retreading solid rubber tires comprising making dovetail grooves in the periphery of the old tire, applying rubber cement, and filling the grooves with gum rubber.

3. The step in a method for retreading solid rubber tires comprising rotating the worn tire and machining the face of the worn tire to produce a smooth surface, forming dovetail grooves in the smooth surface, filing the smooth surface to produce a roughened surface, applying rubber cement, and applying gum rubber.

4. The step in a method for retreading solid rubber tires consisting of rotating the worn tire and machining the face of the worn tire to produce a smooth surface and smooth sides, forming dovetail grooves from the smooth surface, roughening the smooth surface, applying rubber cement to the surfaces, filling the dovetail grooves with gum rubber, and rolling gum rubber on to the periphery to build up a tread to the desired height.

5. A step in the method of retreading solid rubber tires consisting of rotating the worn tire and machining the face of the worn tire to produce a smooth surface and forming dovetail grooves in the smooth surface, applying rubber cement to the surface, of applying gum rubber to build up a new tread, and of applying heat and pressure to the side faces and periphery of the new tread to form the new tread into a properly homogeneous mass.

In testimony whereof I have signed my name to this specification.

EMMET S. LONG.